United States Patent [19]

Lamping

[11] Patent Number: 5,463,369

[45] Date of Patent: Oct. 31, 1995

[54] MESSAGE EMITTING DEVICE

[76] Inventor: George Lamping, 1300 Grove Ave. Ste. 103, Barrington, Ill. 60010

[21] Appl. No.: 134,211

[22] Filed: Oct. 8, 1993

[51] Int. Cl.⁶ .............................. G08B 3/00; G08B 25/08
[52] U.S. Cl. ....................... 340/384.7; 340/384.1; 340/692; 340/457; 340/457.1; 280/801.1; 280/808
[58] Field of Search .............. 340/384.7, 384.1, 340/692, 468, 457, 457.1; 381/51; 280/801.1, 808; 297/482

[56] References Cited

U.S. PATENT DOCUMENTS

| | | | |
|---|---|---|---|
| 4,755,789 | 7/1988 | Paschal | 340/692 |
| 4,810,996 | 3/1989 | Glen et al. | 340/692 |
| 4,923,106 | 12/1990 | Strovinskas | 297/482 |
| 4,987,403 | 1/1991 | Apfel | 340/692 |
| 5,005,866 | 4/1991 | Reedom | 280/801 |

Primary Examiner—Donnie L. Crosland
Attorney, Agent, or Firm—Thomas R. Vigil

[57] ABSTRACT

The message emitting device comprises: a flexible sheet of material; sound emitting circuitry mounted to the sheet of material and comprising an electronic circuit which includes a sound synthesizer, a sound producing device and a power supply coupled together; a switching structure for actuating the electronic circuit; and structure for attaching the message emitting device to a living body or to structure adjacent a living body.

14 Claims, 5 Drawing Sheets

5,463,369

MESSAGE EMITTING DEVICE

BACKGROUND OF THE INVENTION

1. Field of the Invention

The present invention relates to a message emitting device having structure for attaching the message emitting device to a living body or to an adjacent living body. More specifically, the message emitting device includes a sheet of flexible material having sound emitting circuitry mounted thereto and is shaped like and has a colored drawing on the front side thereof to look like a real or imaginary character, e.g. a football player. One specific embodiment includes means for attaching the device to a strap of a seat belt assembly and the sound emitting circuit is constructed and arranged to emit a safety message when the sound emitting circuit or circuitry is activated.

2. Description of the related art including information disclosed under 37 CFR §§ 1.97–1.99.

Heretofore it has been proposed to provide a device for fastening to a strap of a seat belt assembly which comprises a sheet of plastic material, preferably two ply, configured in the shape of a real or imaginary character with the front side of the sheet having a colored drawing of the character and with the device having structure for connecting it to a strap of a seat belt assembly.

SUMMARY OF THE INVENTION

According to the present invention there is provided a message emitting device comprising: a flexible sheet of material; sound emitting circuitry mounted to the sheet of material and comprising an electronic circuit which includes a sound synthesizer, a sound producing device and a power supply coupled together; a switching structure for actuating the electronic circuit; and structure for attaching the message emitting device to a living body or to structure adjacent a living body.

DESCRIPTION OF THE PREFERRED EMBODIMENT(S)

Figure 1:
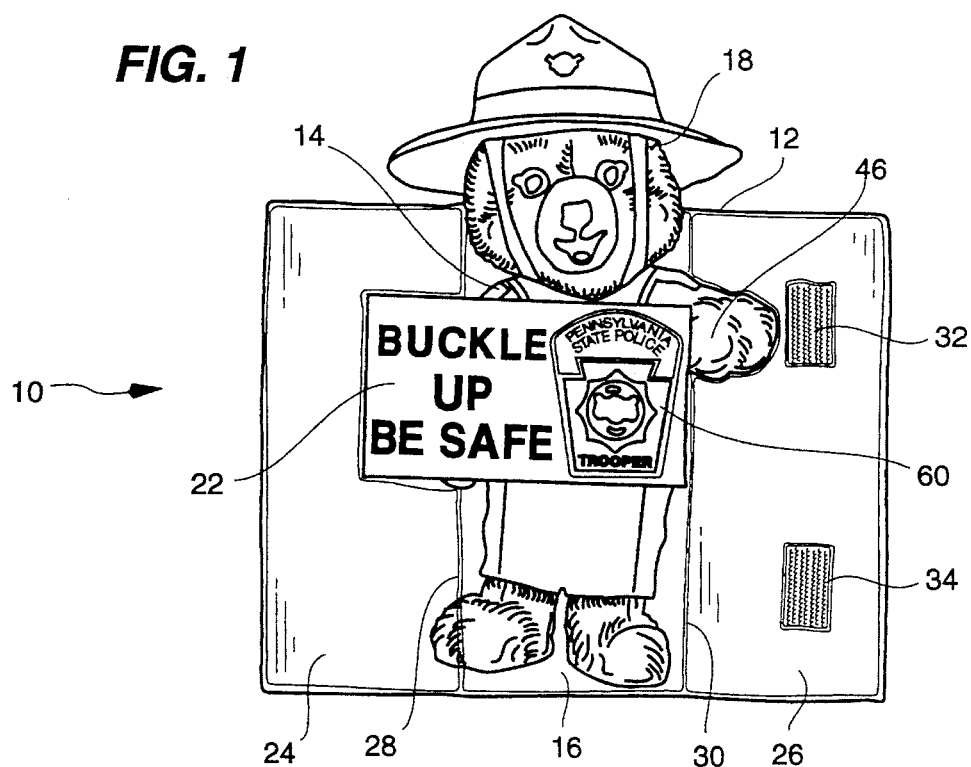
FIG. 1 is a front plan view of one form of message emitting device constructed according to the teachings of the present invention.

Referring now to the drawings in great detail, there is shown in FIG. 1 a front plan view of a message emitting device 10 constructed according to the teachings of the present invention. The device 10 contains at least one ply 12 of plastic sheet material having the drawing of, and the partial shape of, a character 14 on the front thereof in a center panel portion 16 of the plastic sheet material. In this embodiment, the character 14 is a bear dressed in a state police trooper uniform. The upper part 18 of the character, i.e. head portion 18, extends upwardly from the center panel portion 16 in the shape of a bear with a state police trooper's hat. Within the center panel portion 16 of the ply 12 of plastic sheet material there is drawn in color the configuration of the rest of the character, i.e. of the bear state trooper.

Further in this illustrated embodiment, the bear 14 is shown holding a sign 22 stating "Buckle Up—Be Safe" which is configured to extend outwardly to one side of the center panel portion.

The outer ply 12 of the sheet material also has two side panel portions 24 and 26 hingedly connected to the center portion along hinge lines 28 and 30, respectively. The side panel portion 26 has two patches 32 and 34 of hook and loop type fastening material of the type sold under the trademark VELCRO®.

Figure 3:
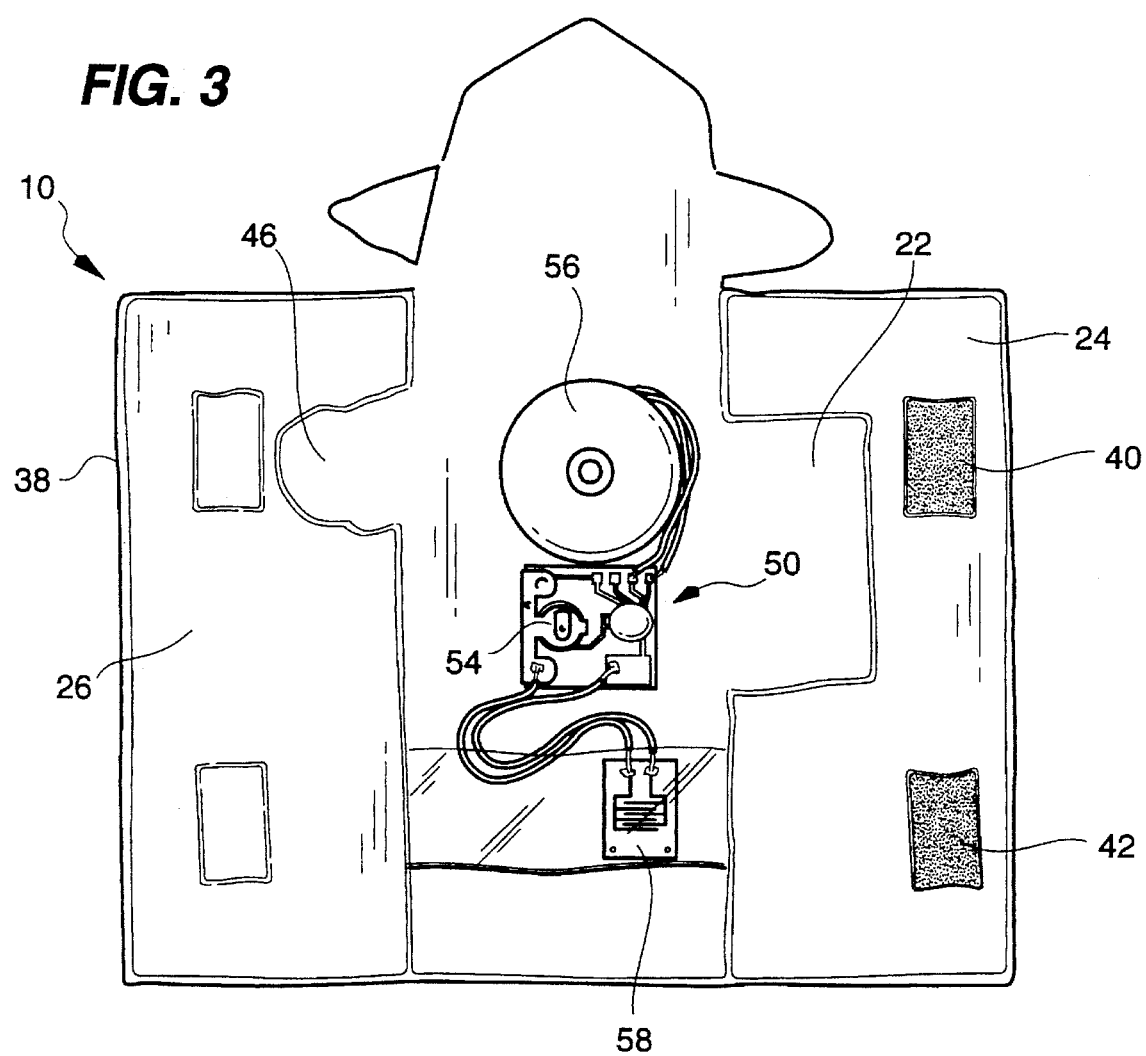
FIG. 3 is a rear plan view of the message emitting device shown in FIG. 1 and shows electrical circuit elements mounted on the rear side of the device.

As shown in a rear view of a two ply sheet of material, i.e., in FIG. 3, the back side of the device 10 is a second ply 38 of plastic sheet material. Here, the side panel portion 24 has on the back side thereof two patches 40 and 42 of hook and loop type fastening material sold under the trademark VELCRO®.

Figure 2:
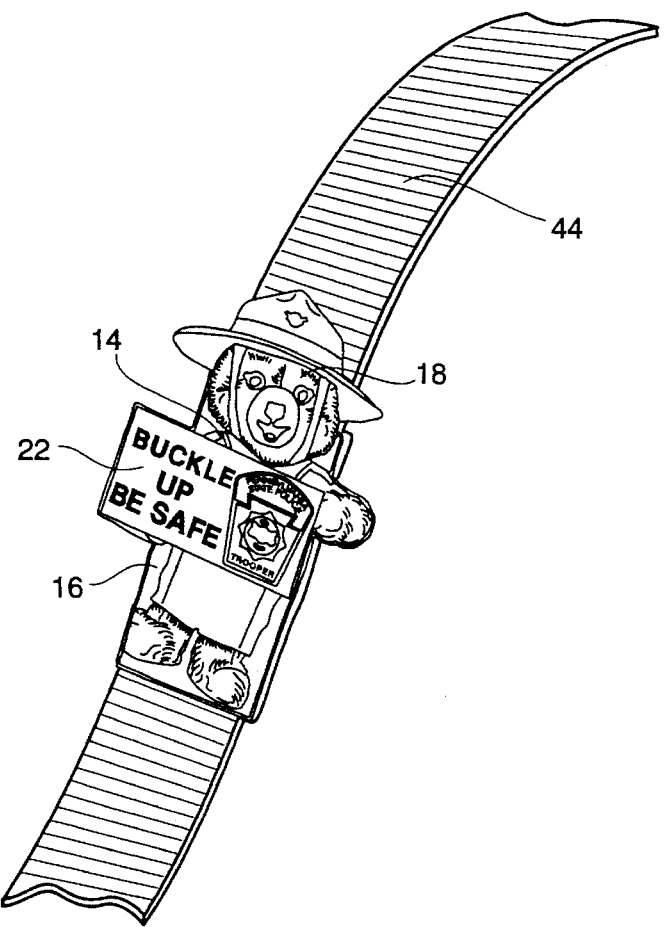
FIG. 2 is perspective view of the message emitting device shown in FIG. 1 mounted upon a shoulder strap of a seat belt assembly of an automobile.

It will be understood that with this construction of the device 10, the device 10 can be positioned on a strip of material, such as a strap 44 of a seat belt assembly (FIG. 2) and the side panel portion 26 can be folded behind the strap 44 followed by folding the other side panel portion 24 behind the strap 44 and over the front side of the folded side panel portion 26 so as to bring the patches of loop and hook material 32, 34, 40 and 42 into contact with each other for releasably fixing the device 10 on the strap 44, as shown in FIG. 2.

It is to be understood however that the device can also be provided with a pin, clamp or loop of string or cord for releasably fixing the device 10 to a living body or to structure, e.g., a seat belt strap, adjacent a living body.

Referring now to FIG. 3, there is illustrated therein the back side ply 38 of the device 10. As shown, the device 10 includes the inner or back side ply 38 of material which is seamed along the outer edges thereof to the front side or ply 12 of material. It will be understood that the margin around a left hand 46 of the character 14 shown in FIG. 1 is cut, as is the margin around the sign 22 extending to the right of the character 14 shown in FIG. 1, so that when the first and second side panel portions 24 and 26 are folded behind the strap 44, the arm 46 will stick out on one side and the sign 22 will stick out on the other side.

Then, according to the teachings of the present invention, an electronic sound producing circuit 50 is mounted to the back ply 38 or, and preferably, between the plies 12 and 38. This circuit 50 includes a sound or speech synthesizer chip 52, a power supply of one or more batteries 54, a sound producing element 56, in this case, a speaker 56, and a switch 58 for actuating the electronic sound producing circuit 50. The sound or speech synthesizer chip 52 can be of the type which synthesizes a melody or which synthesizes a voice message such as "Buckle Up—Be Safe" or "Don't Drink—Or Don't Drive".

Also, of course, other safety messages and other messages of general import can be programmed into the chip 52.

Preferably, the switch 58 for actuating the electronic circuit 50 is mounted in a position behind a badge 60 shown on the front side of the ply 12 of plastic sheet material so that pressing on the badge 60 will close the switch 58 to actuate the electronic circuit 50 shown in FIG. 3.

Figure 4:
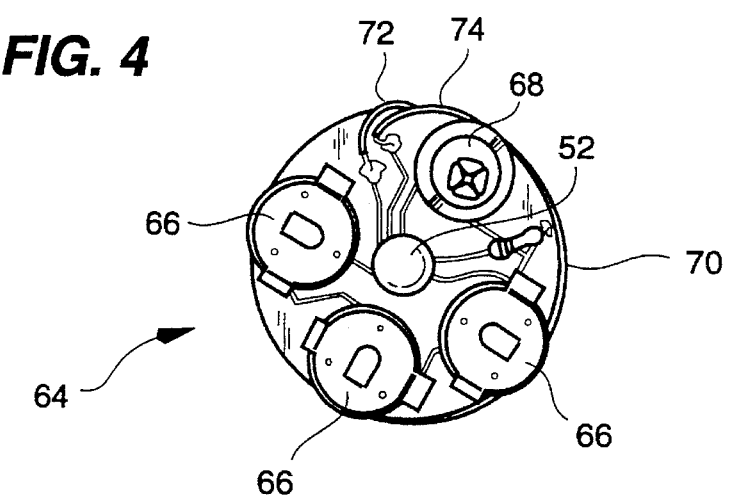
FIG. 4 is a plan view of another embodiment of circuit elements of the device where a circuit board has a speaker mounted on one side of the board and a chip, batteries and a diagram switch mounted on the other side of the board.

FIG. 4 is a plan view of a circular electric circuit board 64 for the electronic circuit 50. Here the speech or sound synthesizer chip 52 is mounted in the middle of the board 64, three battery units 66 are mounted adjacent the periphery of the circular board 64 and a diaphragm type switch 68 is mounted on the board 64 in the position shown. A speaker 70 is mounted on the other side of the circuit board 64 and connected by wires 72 and 74 to the rest of the circuit 50 mounted on the first side of the circular circuit board 64.

Figure 5:
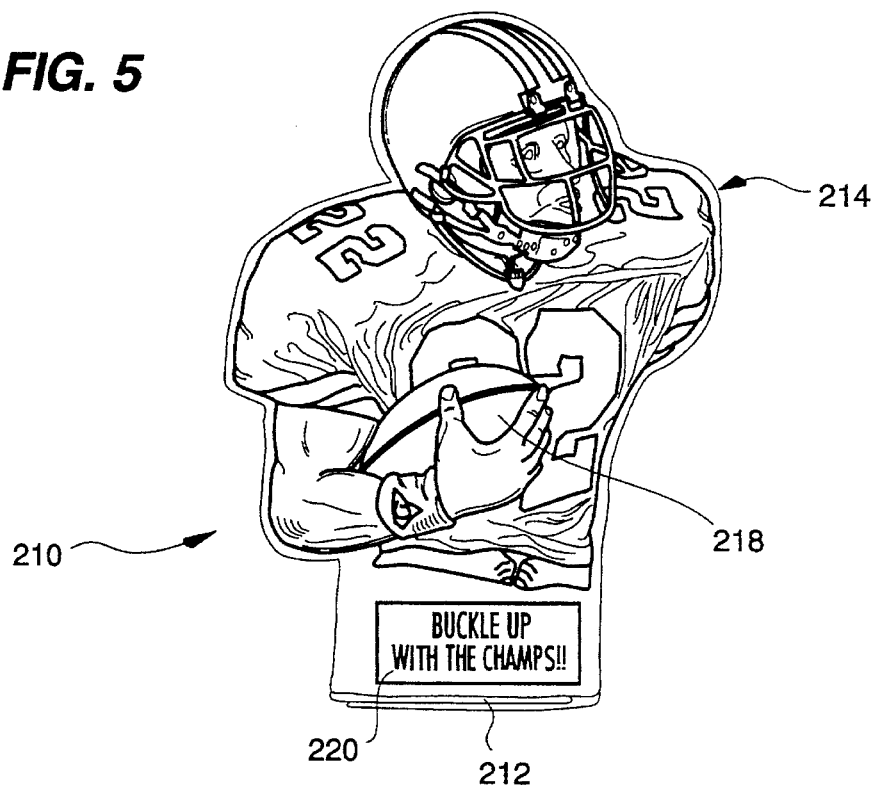
FIG. 5 is a front plan view of another embodiment of a message emitting device constructed according to the teachings of the present invention and having the outline and picture of a sports figure, namely a football player.

FIG. 5 is another embodiment of a message emitting device 110 which is constructed according to the teachings of the present invention, which is made of one or two plies of plastic sheet material and which has, in a center panel portion 112 thereof, the drawing and configuration of a football character 114 holding a football 118. In this embodiment, the football 118 is positioned in front of a switch, which can be a diaphragm type switch (not shown), so that pressing the football 118 will close the switch to actuate the electronic circuit of the device 110.

Figure 6:
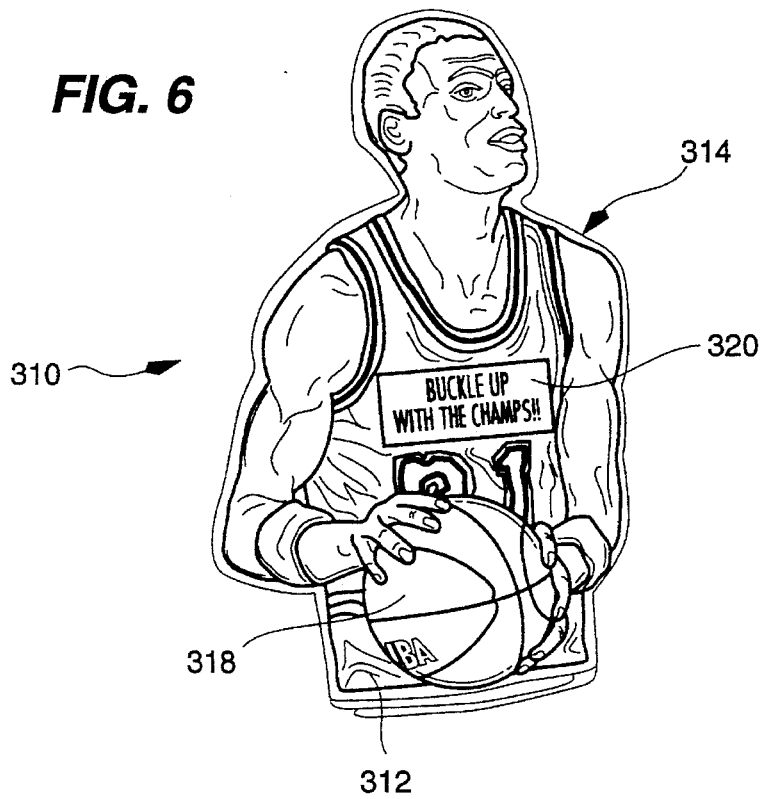
FIG. 6 is a front plan view of still another embodiment of a message emitting device constructed according to the teachings of the present invention and having the outline and picture of a sports figure, namely a basketball player.

Similarly, FIG. 6 is still another embodiment of a message emitting device 210 which is constructed according to the teachings of the present invention and which has, in a center panel portion 212 of an outer ply of plastic sheet material of which the device 210 is made, the picture or drawing and outline of a basketball player character 214 holding a basketball 218. As with the football character 114 shown in FIG. 5, the ball 218 held the basketball player is positioned in front of a switch such that pressing of the basketball will close the switch to actuate the electronic circuit of the device 210.

In the embodiments shown in FIGS. 5 and 6, the message can be "Buckle Up With the Champs". Such message can also be placed in a legend on the center panel portion 112 or 212.

Figure 7:
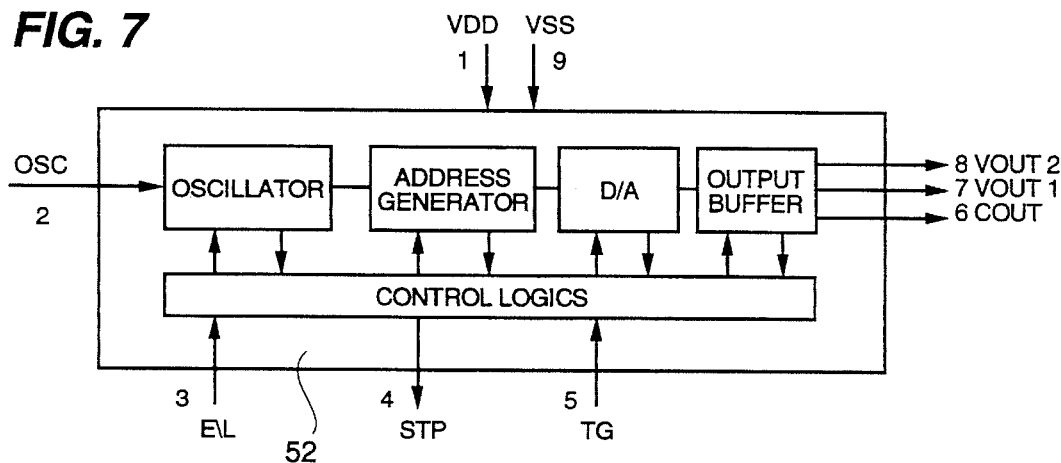
FIG. 7 is a circuit diagram of a speech synthesizing chip.

In FIG. 7 there is illustrated a block electrical circuit diagram of the components of the speech synthesizer chip 52 which includes an oscillator, an address generator, a digital to analog converter, D/A, an output buffer circuit and control logic, e.g. control and timing logic circuitry, as well as input and output ports.

This chip 52 can be an MSS0281 single-chip speech synthesizing CMOS VISI that can synthesize voice up to 2.8 seconds. The chip 52 contains most of the necessary circuit elements described above so that it can apply to various voice systems with minimum external parts.

Several chips 52 can be cascaded to reach longer voice duration (longer than 2.8 seconds). Customer speech data will be edited and programmed into PLAY by changing one mask during the fabrication of the chip.

A number of features of this form of e chip 52 are:

Single power can operate at 2.4 V through 5 V.

Direct drive buzzer and one current output could drive speaker.

Total maximum duration is 2.8 seconds, speech+ mute is about 6 second.

Automatic power down.

Repeat function that can repeat up to 8 times.

Cascade function that can extend the speech duration by 2.8×N seconds with N pieces of MSS0281.

Bonding option for edge trigger (CDS photo-resistor application) or level trigger.

Figure 8A:
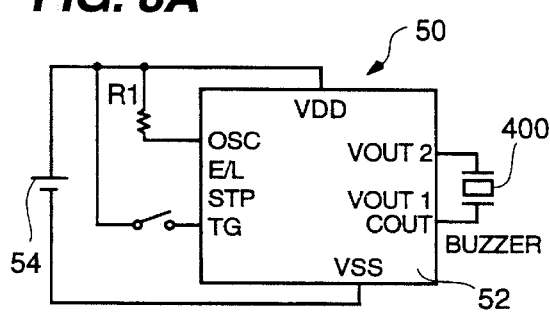
FIG. 8A is a block circuit diagram of a single chip circuit with an output to a buzzer.

FIG. 8A is a simple construction of the electronic circuit 50 wherein the speech synthesizing chip 52 is connected to a sound producing element defined by a buzzer 400.

Figure 8B:
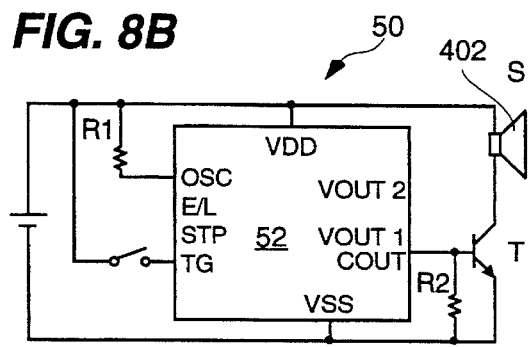
FIG. 8B is a block circuit diagram of a single chip circuit with an output to a speaker.

FIG. 8B is a simple construction of the electronic circuit 50 wherein the speech synthesizing chip 52 is connected to a sound producing element defined by a speaker 402.

Figure 9A:
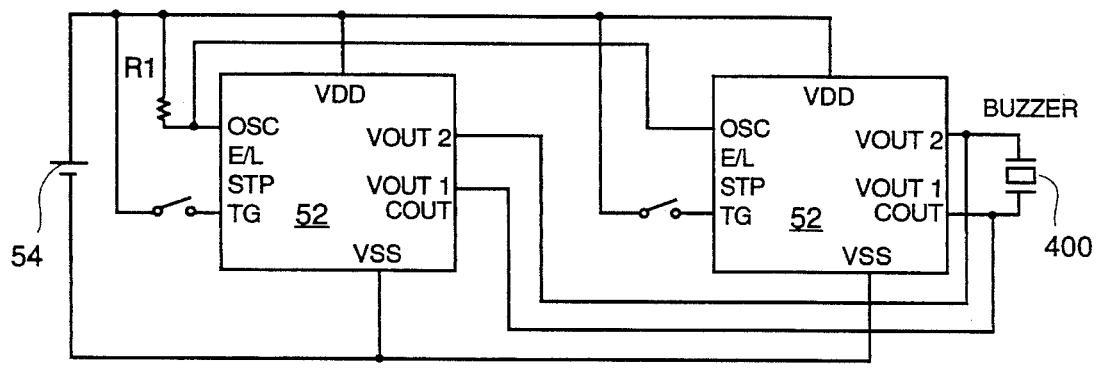
FIG. 9A is a block circuit diagram of a double or parallel chip circuit with an output to a buzzer.

FIG. 9A is another embodiment of an electronic circuit 450 constructed according to the teachings of the present invention for use in the device 10 where two synthesizing chips 52 are connected in parallel to extend desired voice sections in a parallel arrangement with the sound producing element being a buzzer 400 connected to the chips 52.

Figure 9B:
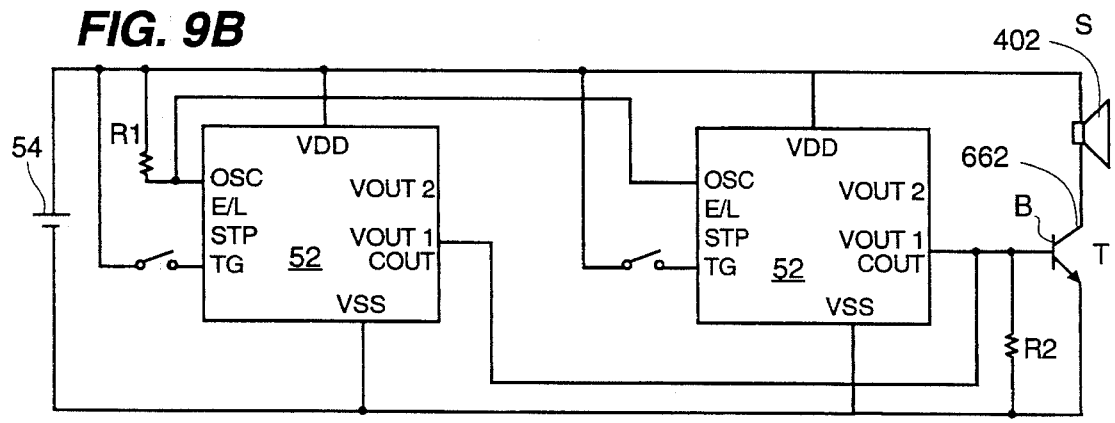
FIG. 9B is a block circuit diagram of a double or parallel chip circuit with an output to a speaker.

FIG. 9B is another embodiment of an electronic circuit 460 constructed according to the teachings of the present invention for use in the device 10 where two synthesizing chips 52 are connected in parallel to extend desired voice sections in a parallel arrangement with the sound producing element being a speaker 402 connected to the chips 52.

Figure 10A:
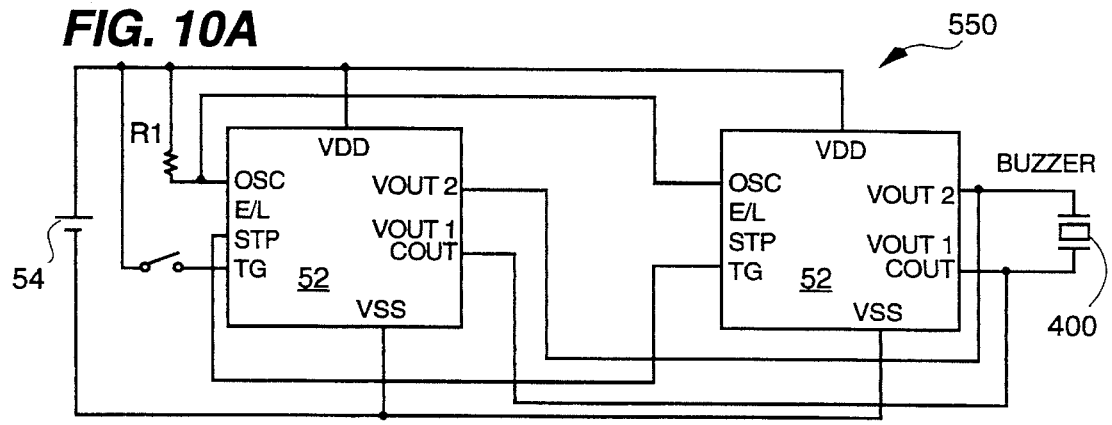
FIG. 10A is a block circuit diagram of a two chip cascade circuit arrangement with an output to a buzzer.

FIG. 10A is another embodiment of an electronic circuit 550 constructed according to the teachings of the present invention for use in the device 10 where two synthesizing chips 52 are connected in a cascade arrangement to extend the desired voice length in a cascade arrangement and where the outputs from the two speech synthesizing chips 52 are connected to a buzzer 400.

Figure 10B:
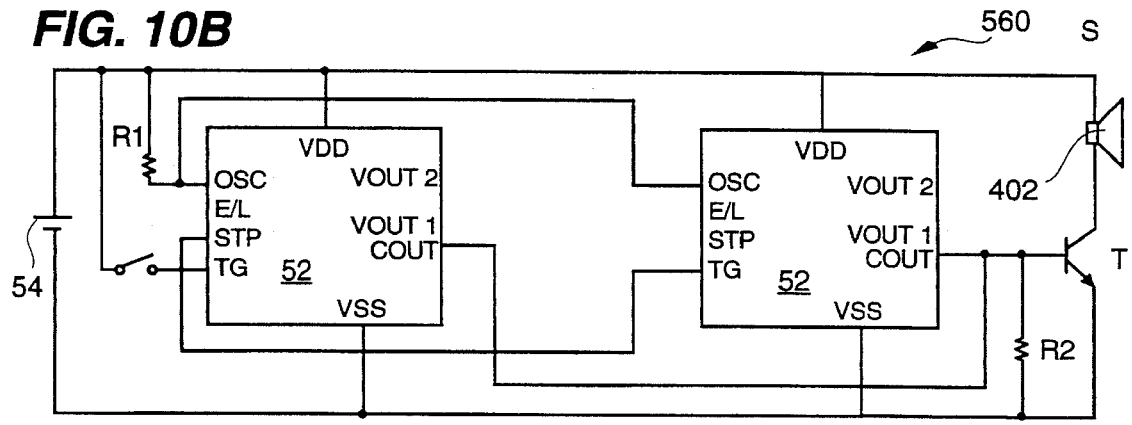
FIG. 10B is a block circuit diagram of a two chip cascade circuit arrangement with an output to a speaker.

FIG. 10B is another embodiment of an electronic circuit 550 constructed according to the teachings of the present invention for use in the device 10 where two synthesizing chips 52 are connected in a cascade arrangement to extend the desired voice length in a cascade arrangement and where the outputs from the two speech synthesizing chips 52 are connected to a speaker 402.

Figure 11:
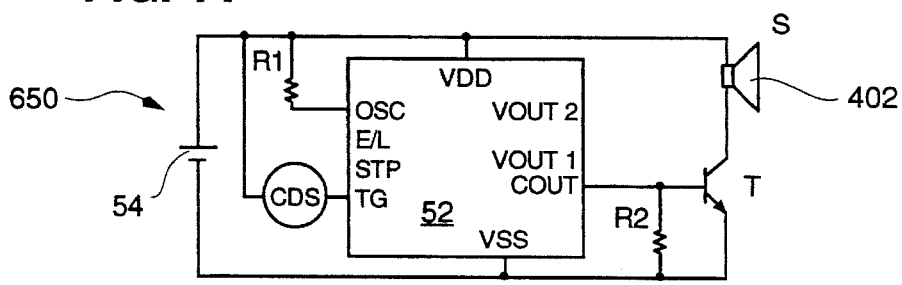
FIG. 11 is a block circuit diagram of a light triggered single chip circuit with an output to a speaker.

FIG. 11 is a block circuit diagram of another embodiment of an electronic circuit 650 constructed according to the teachings of the present invention for use in the device 10. The circuit 650 is a CDS or light triggered circuit 650. As shown, the circuit 650 includes a single speech synthesizing chip 52 having an output to a speaker 402.

Figure 12:
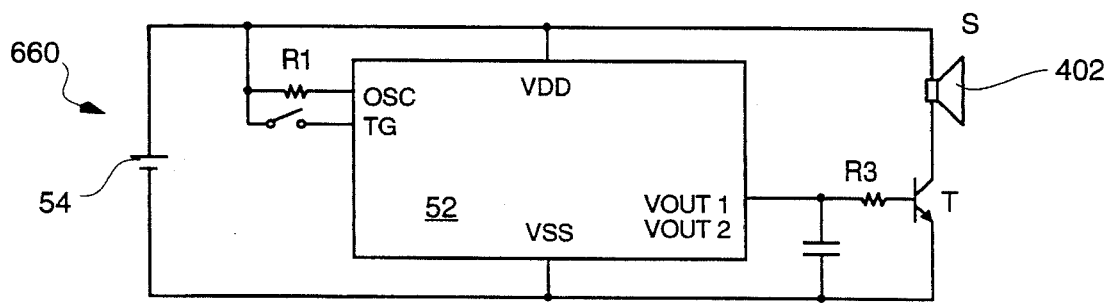
FIG. 12 is a block circuit diagram of a single chip circuit using the VOUT1 output to drive a speaker.

FIG. 12 is a block circuit diagram of another embodiment of an electronic circuit 660 constructed according to the teachings of the present invention for use in the device 10. The circuit 660 is driven by the signal at the output of the port VOUT1 and has a speaker 402 coupled in series with a transistor 662 having a base B coupled through a resistor R3 to the output VOUT1.

From the foregoing description, it will be apparent that the message emitting device 10 of the present invention has a number of advantages, some of which have been described above and others of which are inherent in the invention. Also it will be understood that modifications can be made to the message emitting device 10 described above without departing from the teachings of the invention.

What is claimed is:

1. A message emitting device comprising:

a two ply flexible sheet of material shaped like and having a drawing on a front side thereof to look like a real or imaginary character;

sound emitting means mounted to said sheet between the plies and comprising an electronic circuit mounted to at least one of said plies which includes a sound synthesizer, sound producing means and a power supply coupled together for emitting a reminder message to a person wearing the device;

pressure sensitive switch means for actuating said electronic circuit; and means for attaching said message emitting device to a belt or strap of a seat belt assembly for a human being.

2. The device of claim 1 wherein said sheet of material includes a center panel portion and first and second side panel portions each hingedly connected at a foldline to said center panel portion.

3. The device of claim 2 wherein one of said side panel portions has first attachment means on a front side thereof so as to face rearwardly and outwardly when said panel section is folded behind a strip of material positioned behind said center panel portion and said other side panel portion has second attachment means on a rear side thereof such that said second attachment means will face forwardly against and in contact with said first attaching means when that side panel portion is folded behind the strip of material so that the first and second attaching means form said means for attaching said device to structure adjacent said living body and engage each other for fastening the message emitting device about the strip of material.

4. The device of claim 1 wherein said sound synthesizer is a speech synthesizing chip.

5. The device of claim 4 wherein said speech synthesizing chip comprises an oscillator, an address generator coupled to said oscillator, control and timing logic circuitry coupled to said address generator, a digital to analog converter coupled to said logic circuitry, and an output buffer circuit coupled to said converter.

6. The device of claim 5 wherein said sound producing means comprises a buzzer for emitting different sounds.

7. The device of claim 5 wherein said sound producing means includes a speaker.

8. The device of claim 5 wherein two speech synthesizing chips are connected in parallel to extend desired voice sections.

9. The device of claim 5 wherein two speech synthesizing chips are connected in a cascade arrangement to extend the desired voice length in a serial manner.

10. The device of claim 1 wherein said character is selected from the group consisting essentially of a sports character, a real character associated with safety and a fictional character associated with safety.

11. The device of claim 1 wherein said pressure sensitive switch means is aligned with a drawing of an item on or carried by the character drawn on said front side of said device, such item being an item that one touches to engage said actuating means for actuating said message emitting device.

12. The device of claim 11 wherein said item is selected from the group consisting essentially of a badge worn by an official or a ball held or carried by a sports character.

13. The device of claim 1 wherein said message emitted by said device is a safety or instructional message.

14. The device of claim 1 being constructed and arranged to be mounted on a shoulder strap of the seat belt assembly.

* * * * *